Figure 1:
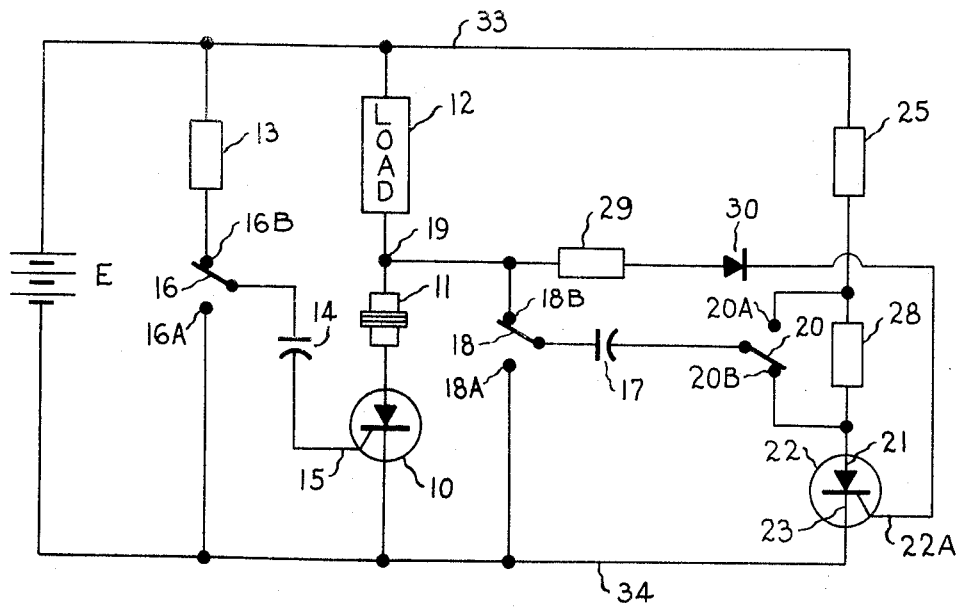

March 1, 1966

E. B. HEFT ETAL 3,238,419

ELECTRICAL PROTECTIVE CIRCUIT

Filed June 7, 1962

INVENTORS
ELDON B. HEFT,
RALPH L. HURTLE
BY Robert T. Casey
ATTORNEY

United States Patent Office 3,238,419
Patented Mar. 1, 1966

3,238,419
ELECTRICAL PROTECTIVE CIRCUIT
Eldon B. Heft and Ralph L. Hurtle, West Hartford, Conn., assignors to General Electric Company, a corporation of New York
Filed June 7, 1962, Ser. No. 200,771
4 Claims. (Cl. 317—33)

The present invention relates to electrical protective circuits, and particularly to protective circuits of the type utilizing an electronic control element as the main current controlling means.

In accordance with the prior art, electrical protective circuits have been provided utilizing as a main current control device an electronic control element such as a conventional silicon controlled rectifier having a cathode, anode, and a control element or "gate." As is well-known, the characteristics of the silicon controlled rectifier are such that once placed in a conducting condition, it remains in such condition until current is brought to zero and maintained at zero for a predetermined time.

In accordance with the prior art protective circuits referred to, means is provided for automatically placing such a silicon controlled rectifier in non-conducting condition upon the occurrence of a predetermined current in the controlled circuit. This means comprises a pre-charged capacitor and means for connecting the pre-charged capacitor in parallel with the main silicon controlled rectifier in such a sense that the capacitor's charge is in opposition to the voltage of the main circuit.

For the purpose of automatically connecting the aforesaid capacitor across the main controlled rectifier on the occurrence of predetermined current conditions, a second silicon controlled rectifier is provided. The second controlled rectifier has its gate electrode connected, through a voltage-breakdown type device, to one side of a resistance element which is in series with the first controlled rectifier.

Upon the occurrence of predetermined high current conditions through the first controlled rectifier, a corresponding high voltage-drop appears across the resistor. This voltage causes the voltage-breakdown device to suddenly break down or become conductive, permitting the voltage drop appearing across the resistor to appear on the gate electrode of the second controlled rectifier as a positive pulse, thereby placing this controlled rectifier in conducting condition. When the second controlled rectifier is placed in conducting condition, it provides a path by which the capacitor's charge is applied across the first controlled rectifier as previously described. The capacitor is chosen so that when this occurs, it will maintain a negative sense voltage across the first controlled rectifier for a period of time sufficient to cause this rectifier to be placed in the non-conducting condition, thereby turning off the main current. It will be observed that the resistor referred to, combined with the voltage-breakdown device, functions as a "step type" signal generating device to suddenly apply a "turn on" voltage to the second controlled rectifier.

A circuit of the type described above is shown in application Serial No. 30,484, now Patent No. 3,098,949, by Leon J. Goldberg, filed Feb. 12, 1960, and assigned to the same assignee as the present invention.

It is an object of the present invention to provide a circuit of the type described above including a single element capable of performing the function of developing a signal voltage on the occurrence of predetermined current conditions, and the function of providing such a signal having a steep wavefront, thereby eliminating the need for a separate voltage-breakdown type device as previously required.

It is another object of the invention to provide a circuit of the type described including a unitary step-type signal-voltage generating means which also serves to provide means limiting current flow prior to turn-off of the main current controlling device.

In accordance with the invention in one form, an electrical protective circuit is provided comprising a first silicon controlled rectifier connected in series with a load circuit to be controlled. A "turn off" capacitor is also provided, connected, in series with a second silicon controlled rectifier, in parallel with the first silicon controlled rectifier. In order to place the second silicon controlled rectifier in conducting condition upon the occurrence of predetermined current conditions through the main load circuit, there is provided, in accordance with the invention, a current limiting device which normally has a relatively low resistance but which upon the occurrence of predetermined current conditions changes its state suddenly to a high resistance, without permanently interrupting current therethrough, thereby limiting the current therethrough and at the same time generating a substantial voltage drop thereacross. The current limiting device referred to is connected in the main load circuit, in series with the main controlled rectifier. The positive or high voltage side of the current limiting device is connected to the gate electrode of the second silicon controlled rectifier, whereby the change of said current limiting device to a high resistance condition causes a positive voltage to be applied to the gate electrode of the second silicon controlled rectifier, turning this rectifier to on condition and discharging the turn-off capacitor.

Figure 2:
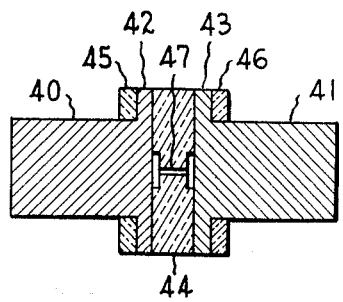

The invention will be more fully understood from the following detailed description, and its scope will be pointed out in the appended claims:

FIGURE 1 is a schematic diagram of an electrical protective circuit in accordance with the invention, and FIGURE 2 is a sectional view of the current limiting device utilized in the circuit of FIGURE 1.

Referring to FIGURE 1, the invention is shown as incorporated in an electrical protective circuit comprising a main silicon controlled rectifier 10, connected in series with a current limiting device 11 and a load 12 to be controlled between high-voltage and ground conductors or buses 33, 34, respectively of a suitable voltage source E. A resistor 13 is provided connected between the bus 33 and a capacitor 14, which in turn is connected to the gate electrode 15 of the main silicon controlled rectifier 10. A manual switch 16 is provided for selectively connecting the capacitor 14 to the resistor 13 or to the ground bus 34.

A "turn off" capacitor 17 is also provided, normally connected through a switch 18 to the line side of the current limiter 11 at 19. The other side of the capacitor 17 is normally connected through a switch 20 to the anode 21 of a second silicon controlled rectifier 22, having its cathode 23 connected to the ground bus 34.

For the purpose of quickly pre-charging the capacitor 17, the switch 20 is provided with a contact 20A, connected through a relatively low resistance 25 to the line potential bus 33. When the switch 20 is placed in closed condition with respect to the contact 20A, the switch 18 is simultaneously moved to position in contact with the contact 18A. This serves to connect the capacitance 17 across the voltage source E through the resistor 25, to quickly place a charge on the capacitor 17 equal to the voltage source E. For normal operation, the switches 18 and 20 are returned to the condition shown in FIGURE 1.

A relatively high value resistor 28 is also provided, connected to one side of the capacitor 17 during normal operation, whereby to maintain the charge of the capacitor 17 despite leakage losses.

The line side of the current limiting device 11 is also connected, through the resistor 29 and the rectifier 30, to the gate electrode 22A of the control rectifier 22, for a purpose to be described.

The rectifier 30 is included for the purpose of preventing discharge of the capacitor 17 around the loop including switch 20, control rectifier 22, gate electrode 22A, resistor 29, and switch 18.

In operation, assuming the controlled rectifier 10 to be in non-conducting condition, in order to re-start current flow, the switch 16 is moved to closed position with respect to contact 16A, thereby discharging the capacitor 14.

Switch 18 is placed in closed position with respect to contact 18A, connecting a first side of the capacitor 17 to ground. Switch 20 is placed in closed position with respect to contact 20A, connecting the second side of the capacitor 17 to the line bus 33, through the resistor 25.

Under these conditions, the capacitor 17 is quickly charged to the potential of the source E.

The switches 18 and 20 are then returned to the positions shown in FIGURE 1. The switches 18 and 20 are preferably ganged together for simultaneous operation, in such a manner that both switches are open at the same time for at least a short time during the switching process.

The circuit is now in condition for starting load current flow. Starting is accomplished by placing the switch 16 in closed position with respect to contact 16B.

This causes a positive voltage pulse to appear on the gate electrode 15 as the capacitor 14 is charged. This starts the controlled rectifier 10 conducting, the current flow being determined essentially by the magnitude of the load 12. The resistances of the current limiter 11 and of the controlled rectifier 10 are each negligible at this time.

It will be observed that the capacitor 17 is maintained in charged condition during normal operation of the circuit by reason of the fact that its said first side is maintained essentially at ground potential since it has only the negligible resistance of the current limiter 11 and the control rectifier 10 between it and the ground bus 34, and by reason of the further fact that its said second side is maintained in charged condition by connection through the resistors 28 and 25 to the line bus 33. The resistor 28 is made relatively high to permit re-charging of the capacitor 17 to occur during normal use to replace normal leakage losses, while preventing discarge of the capacitor 17 through this path if and when the load 12 is short-circuited.

Upon the occurrence of abnormally high or "overload" current conditions, such, for example, as may be caused by a change of the load 12, the current limiter 11 changes its condition from a relatively low resistance to a relatively high resistance, in a manner to be described. This causes the voltage-drop appearing across the current limiter 11 to rise sharply. This voltage is applied by way of the resistor 29, and rectifier 30 to the gate electrode 22A of the controlled rectifier 22. This causes the controlled rectifier 22 to change to conducting condition, providing a path through which the charge across the capacitor 17 is allowed to appear across the combination of the current limiter 11 and the silicon controlled rectifier 10.

It will be observed that since the capacitor 17 was initially charged with its said first side, in contact with the contact 18, negative, and with its second side, in contact with the contact 20B, positive, the voltage applied across the combination of the current limiter 11 and the control rectifier 10 is in an opposite sense to that applied by the voltage source E. It will be observed, moreover, that a discharge path exists for the capacitor 17, in reverse sense through the source E and through the partially short circuited load 12. During the time in which the capacitor 17 discharges in this manner, the net voltage appearing across the controlled rectifier 10 is reduced substantially to zero, thereby causing the controlled rectifier 10 to revert to its non-conducting condition. In the absence of another positive pulse on the gate electrode 15, the controlled rectifier 10 remains in a non-conducting condition, providing a permanent disconnection of the main load circuit.

It will be observed that even though the switch 16 may be left in the position in which it is closed with respect to contact 16B, no pulse will appear on the gate 15 until the switch 16 is moved to contact 16A, discharging the capacitor 14, and then reclosed on contact 16B.

When the overload condition has been removed and the load restored to its normal condition, the circuit may be again reclosed by renewing the charge on the capacitor 17 and by applying a positive turn-on voltage pulse to the gate electrode 15 of the controlled rectifier 10.

The current limiter 11 utilized in accordance with the invention is preferably of the type shown in co-pending application Ser. No. 29,629, filed May 18, 1960, by R. L. Hurtle, now Patent No. 3,117,203, assigned to the same assignee as the present invention. While the construction and operation of the current limiter 11 is set forth in detail in the aforesaid application, its construction and operation will be described here briefly for the sake of completeness.

Referring to FIGURE 2, the current limiter 11 comprises a pair of cylindrical metallic terminal portions 40 and 41. The terminals, 40, 41, have integral circular flange portions, 42, 43, respectively.

A circular disc 44 of ceramic material is positioned between the flanges 42, 43, and is securely bonded thereto. A pair of annular rings 45, 46 are positioned against the outer surfaces of the flanges 42, 43, and are also securely bonded thereto.

The disc 44 has a central capillary opening 47 therethrough, having enlarged end portions as shown. Capillary 47 and its enlarged end portions are completely filled with a liquid conducting medium such as mercury, which is contained therein by the terminal members 40, 41. A filling opening, and sealing means, not shown, are also included, as described in the aforesaid application.

In operation, the current limiter 11 normally has a relatively low resistance, the current passing from the terminal 40 to the terminal 41 through the mercury-filled capillary 47.

On the occurrence of high current conditions, such as short circuit conditions, the mercury in the capillary 47 is suddenly transformed to a vapor state, although confined to its initial volume. Conduction through the vapor occurs by an arcing process, but the resistance therethrough is such as to limit the current to a relatively low value. The current is not permanently interrupted by the current limiter, however.

The change of state of the mercury from liquid conducting condition to vapor high resistance condition occurs with such suddenness as to produce a voltage-drop change having an extremely steep or "square" wave-front. Thus the juncture 19 on the line side of the limiter 11, which is normally only a small amount above ground potential, suddenly assumes a potential substantially above ground potential. Thus a positive voltage pulse is applied, as previously described, through the resistor 29 and rectifier 30 to the gate electrode 22A of the controlled rectifier 22, placing it in conducting condition.

For purposes of convenience, the term, "confined-capillary current limiter," will be used herein and in the appended claims to designate a device comprising a filamentary conductor confined by suitable means in such a manner that upon the passage of excess current therethrough, said conductor is suddenly transformed to a high-impedance, high-pressure vapor state, without permanently interrupting current therethrough.

In one embodiment of the invention, circuit components of the following values were found to give satisfactory results:

| | | |
|---|---|---|
| Resistor 13 | ohms | 500 |
| Capacitor 14 | µfd | .1 |
| Capacitor 17 | µfd | 1500 |
| Resistor 25 | ohms | 50 |
| Resistor 28 | do | 30,000 |
| Resistor 29 | do | 500 |

The current limiter utilized included a capillary filled with mercury, having the following dimensions: 0.004 inch diameter, 0.04 inch long.

The controlled rectifiers 10 and 22 were of the silicon controlled rectifier type having a nominal rating of 16 amperes, 100 volts, as manufactured by the General Electric Company under the designation 2N683(C35A)034.

A circuit constructed as shown and described herein and having circuit components of values as listed above, was found to carry 5.4 amperes continuously, and to cause substantially instantaneous interruption of the circuit when the current was increased to 5.6 amperes.

While the current limiter 11 has been shown as connected in series with the silicon controlled rectifier 10 on the line side of the controlled rectifier 10, it will be apparent that the limiter 11 may be connected similarly in series with the controlled rectifier 10 on the load side thereof, the resistor 29 being connected as shown in FIGURE 1, or directly to the line side of the current limiter at its new location, as desired.

It will be observed that because of the non-linear resistance-vs.-current characteristics of the current limiter 11, the necessity for a separate voltage breakdown type device between the limiter 11 and the gate electrode 22A is eliminated.

It will also be observed that since the current limiter 11 does not permanently interrupt current flow it does not perform the main interrupting function, and does not, like a fuse, require replacement. Instead, after the main current has been reduced to zero by the action of the capacitor 17 in turning off the main control rectifier 10, the limiter 11 returns to its normal, low-resistance, condition.

While the invention has been shown in only one particular embodiment, it will be readily apparent that many modifications thereof may be made, and it is therefore intended by the appended claims to cover all such modifications as fall within the true spirit and scope of the invention.

What we claim as new and desire to secure by Letters Patent of the United States is:

1. An electrical protective circuit comprising:
   (a) a main current control device having a first condition in which it is conductive in a first direction and a second condition in which it is substantially non-conductive in said first direction, said device being capable of being changed from said first condition to said second condition by reducing current therethrough in said first direction to zero,
   (b) a current limiting device connected in series with said main current control device said current limiting device having a relatively low resistance normally and changing suddenly to relatively high resistance upon the occurrence of predetermined current conditions therethrough without permanently interrupting current therethrough, said change of resistance of said current limiting device occurring at a rate of speed independent of the rate of rise of current therethrough at the time,
   (c) electrical charge storage means,
   (d) means connecting said charge storage means to said main current control device, said connecting means including a second current control device, said second current control device having a first condition in which it is substantially non-conductive in a first direction and a second condition in which it is conductive in said first direction,
   (e) means connecting said current limiting device to said second current control device whereby the change of said current limiting device from said relatively low resistance to said relatively high resistance condition causes said second control device to change from said first, non-conductive, condition to said second, conductive, condition and to apply the charge of said charge storage means to said first control device in such a sense as to reduce the current through said first control device to zero and to thereby change said first control device from said first, conductive, condition to said second, non-conductive condition.

2. An electrical protective circuit comprising:
   (a) a main current control device having a first condition in which it is conductive in a first direction and a second condition in which it is substantially non-conductive in said first direction, said device being capable of being changed from said first condition to said second condition by reducing current therethrough in said first direction to zero and maintaining said current in said direction at zero for a predetermined time,
   (b) a current limiting device connected in series with said main current control device said current limiting device having a relatively low resistance normally and changing suddenly to relatively high resistance upon the occurrence of predetermined current conditions therethrough without permanently interrupting current therethrough, said change of resistance of said current limiting device occurring at a rate of speed independent of the rate of rise of current therethrough at the time,
   (c) a capacitor,
   (d) means connecting said capacitor to said main current control device, said connecting means including a second current control device, said second current control device having a first condition in which it is substantially non-conductive in a first direction and a second condition in which it is conductive in said first direction,
   (e) means connecting said current limiting device to said second current control device whereby the change of said current limiting device from said relatively low resistance to said relatively high resistance condition causes said second control device to change from said non-conductive condition to said conductive condition and to thereby connect said capacitor to said first control device in such a sense as to reduce the current through said first control device to zero and to maintain said current at zero for a predetermined time while said capacitor discharges, to thereby change said first control device from said conductive condition to said non-conductive condition.

3. An electrical protective device comprising:
   (a) a controlled rectifier having an anode terminal, a cathode terminal, and a gate terminal,
   (b) a confined-capillary current limiting device having an input terminal and an output terminal,
   (c) means connecting said current limiting device electrically in series with said anode and cathode terminals of said controlled rectifier,
   (d) a turn-off capacitor having input and output terminals,
   (e) means connecting said input and output terminals of said capacitor each to one of said anode and cathode terminals of said controlled rectifier,
   (f) said connecting means between said capacitor and said controlled rectifier including a second controlled rectifier in series relation therewith and having an anode terminal, a cathode terminal, and a gate terminal, and (g) means for connecting the input and output terminals of said current limiter across said gate and cathode electrodes of said second controlled rectifier, (h) whereby a sudden voltage-drop across said current-limiter serves to change said second controlled rectifier from non-conductive to conductive condition, and to thereby apply the charge of said capacitor across said first controlled rectifier.

4. An electrical protective device comprising:

(a) a first controlled rectifier having an anode terminal, a cathode terminal, and a gate terminal, (b) a confined-capillary current limiting device having an input terminal and an output terminal, (c) means connecting said anode terminal, said cathode terminal, said input terminal and said output terminal electrically in series, (d) means for connecting said series combination of said current limiting device and said first controlled rectifier in series with an electrical load across a source of electrical power, (e) a turn-off capacitor, (f) a second controlled rectifier having an anode terminal, a cathode terminal, and a gate terminal, (g) means connecting said capacitor and said second controlled rectifier in series, (h) means connecting said series combination of said capacitor and said second controlled rectifier electrically in parallel with said series combination of said current limiting device and said first controlled rectifier, (i) means for maintaining a charge on said capacitor when said series combination of said current limiting device and said first controlled rectifier is connected to said source of electrical power, (j) means for applying the electrical potential drop existing across said current limiter between said gate and said cathode electrodes of said second controlled rectifier, (k) whereby a sudden change of impedance of said current limiting device causes a sudden pulse of voltage to appear between said gate electrode and said cathode electrode of said second controlled rectifier to change said second controlled rectifier from nonconductive to conductive condition, (l) said charge on said capacitor being of such polarity that when said second controlled rectifier changes to said conductive condition, said capacitor is discharged through said source and said load in the same direction as current from said source, whereby to maintain during discharge of said capacitor a potentential across said first controlled rectifier in a sense reverse to that caused by said source.

References Cited by the Examiner

UNITED STATES PATENTS 3,042,838   7/1962   Bedford et al. _____ 317—33 X

SGD. STEPHEN W. CAPELLI, *Primary Examiner.*

SAMUEL BERNSTEIN, *Examiner.*

J. D. TRAMMELL *Assistant Examiner.*